(12) United States Patent
Beauchesne-Martel et al.

(10) Patent No.: US 11,643,965 B2
(45) Date of Patent: May 9, 2023

(54) SYSTEM AND METHOD FOR OPERATING MULTI-ENGINE ROTORCRAFT

(71) Applicant: PRATT & WHITNEY CANADA CORP., Longueuil (CA)

(72) Inventors: Philippe Beauchesne-Martel, Brossard (CA); Stephen Mah, Brossard (CA); Keith Morgan, Westmount (CA); Patrick Manoukian, Saint-Laurent (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 723 days.

(21) Appl. No.: 16/671,070

(22) Filed: Oct. 31, 2019

(65) Prior Publication Data

US 2020/0362753 A1 Nov. 19, 2020

Related U.S. Application Data

(60) Provisional application No. 62/852,428, filed on May 24, 2019, provisional application No. 62/848,699, (Continued)

(51) Int. Cl.
*F02C 6/20* (2006.01)
*B64D 31/06* (2006.01)
(Continued)

(52) U.S. Cl.
CPC ............. *F02C 6/20* (2013.01); *B64D 31/06* (2013.01); *F02C 6/02* (2013.01); *F02C 9/00* (2013.01);
(Continued)

(58) Field of Classification Search
CPC ...... F02C 6/20; F02C 6/02; F02C 9/00; F02C 9/42; B64D 31/06; B64C 27/06;
(Continued)

(56) References Cited

U.S. PATENT DOCUMENTS 5,873,546 A 2/1999 Evans et al.
6,408,258 B1 * 6/2002 Richer ............... G06Q 10/06
702/182
(Continued)

FOREIGN PATENT DOCUMENTS

EP 3693583 8/2020

*Primary Examiner* — Mussa A Shaawat
(74) *Attorney, Agent, or Firm* — Norton Rose Fulbright Canada LLP (57) ABSTRACT

Methods and systems for operating a rotorcraft comprising a plurality of engines are provided. A request to enter into an asymmetric operating regime (AOR), in which at least one active engine of the plurality of engines is operated in an active mode to provide motive power to the rotorcraft and at least one standby engine of the plurality of engines is operated in a standby mode to provide substantially no motive power, is obtained. Engine usage data for the plurality of engines, including at least one first engine and at least one second engine, is determined. Based on the engine usage data, one of the at least one first and second engines is operated as the at least one active engine for the AOR, and the other one of the at least one first and second engines is operated as the at least one standby engine for the AOR.

20 Claims, 7 Drawing Sheets

Related U.S. Application Data filed on May 16, 2019, provisional application No. 62/848,237, filed on May 15, 2019.

(51) Int. Cl.
*F02C 6/02* (2006.01)
*F02C 9/00* (2006.01)

(52) U.S. Cl.
CPC .. *F05D 2220/323* (2013.01); *F05D 2220/329* (2013.01); *F05D 2270/11* (2013.01); *F05D 2270/70* (2013.01)

(58) Field of Classification Search
CPC ......... F05D 2220/323; F05D 2220/329; F05D 2270/11; F05D 2270/70; Y02T 50/60
See application file for complete search history.

(56) References Cited

U.S. PATENT DOCUMENTS

| | | | | |
|---|---|---|---|---|
| 8,437,904 | B2* | 5/2013 | Mansouri | G07C 5/0808 244/152 |
| 8,594,924 | B2* | 11/2013 | King | G06Q 10/0635 701/14 |
| 9,429,077 | B2* | 8/2016 | Morgan | F01D 15/10 |
| 9,500,138 | B1 | 11/2016 | Taylor et al. | |
| 9,586,691 | B2 | 3/2017 | Rossotto et al. | |
| 9,676,488 | B2* | 6/2017 | Alber | B64D 27/02 |
| 9,734,723 | B1* | 8/2017 | Bruno | G08G 5/0052 |
| 9,753,894 | B2* | 9/2017 | Heinzerling | G06Q 10/06 |
| 9,885,297 | B2 | 2/2018 | Wang et al. | |
| 10,173,787 | B1* | 1/2019 | Oltheten | B64D 45/00 |
| 10,202,206 | B2 | 2/2019 | Zhou et al. | |
| 10,229,016 | B2* | 3/2019 | Freydel | G06F 11/1633 |
| 10,235,523 | B1* | 3/2019 | Keller, III | G06F 13/4282 |
| 10,329,028 | B2* | 6/2019 | Abbas | G01M 15/044 |
| 10,336,472 | B2* | 7/2019 | Nicks | G05B 23/0283 |
| 10,392,105 | B2* | 8/2019 | Schaeffer | G05D 1/0858 |
| 2008/0040152 | A1* | 2/2008 | Vian | G05B 23/0283 705/2 |
| 2009/0216398 | A1* | 8/2009 | Lynch | G01M 7/025 701/29.5 |
| 2010/0138132 | A1* | 6/2010 | Apps | G07C 3/08 701/100 |
| 2012/0330495 | A1* | 12/2012 | Geib | G05B 23/0229 701/29.6 |
| 2013/0066515 | A1* | 3/2013 | Sudolsky | G07C 5/0841 701/32.9 |
| 2013/0219905 | A1* | 8/2013 | Marconi | F02C 7/268 60/39.12 |
| 2015/0176488 | A1* | 6/2015 | Borchers | F02C 7/32 60/773 |
| 2016/0200421 | A1* | 7/2016 | Morrison | B64D 27/24 244/17.23 |
| 2016/0225269 | A1* | 8/2016 | Nikolajevic | B64D 45/04 |
| 2017/0050745 | A1* | 2/2017 | Bajekal | B64C 27/008 |
| 2017/0131687 | A1* | 5/2017 | Mercier-Calvairac | G05B 13/024 |
| 2017/0234233 | A1* | 8/2017 | Schwarz | F01D 25/24 60/204 |
| 2018/0009542 | A1 | 1/2018 | Kuster | |
| 2018/0142623 | A1* | 5/2018 | Chiabrando | F02C 7/277 |
| 2018/0201386 | A1 | 7/2018 | Strauss et al. | |
| 2019/0135411 | A1* | 5/2019 | Gonzalez | B64C 27/54 |
| 2019/0248482 | A1* | 8/2019 | Gillett | B64C 27/57 |
| 2020/0255159 | A1* | 8/2020 | Manoukian | F02C 9/00 |
| 2020/0290742 | A1* | 9/2020 | Kumar | B64D 27/10 |

\* cited by examiner

SYSTEM AND METHOD FOR OPERATING MULTI-ENGINE ROTORCRAFT

CROSS-REFERENCE TO RELATED APPLICATIONS

This patent application claims priority of U.S. Provisional Application Ser. No. 62/848,237, filed on May 15, 2019, of U.S. Provisional Application Ser. No. 62/848,699, filed on May 16, 2019, and of U.S. Provisional Application Ser. No. 62/852,428, filed on May 24, 2019, the entire contents of which are hereby incorporated by reference.

TECHNICAL FIELD

The present disclosure relates generally to a multi-power plant engine system, and more particularly to a mode of operation of an aircraft.

BACKGROUND OF THE ART

When operating aircraft with multiple engines, there may be certain portions of a mission that do not require both engines to be operating at full regime. In cruising conditions, operating a single engine at a relatively high regime, instead of multiple engines at lower regimes, may allow for better fuel efficiency. The lower operating regime is sometimes referred to as a "standby" mode. However, certain engine operating states may not be conducive to operating one engine in a standby mode.

Therefore, improvements are needed.

SUMMARY

In accordance with a broad aspect, there is provided a method for operating a rotorcraft comprising a plurality of engines configured to provide motive power to the rotorcraft, the method. A request to enter into an asymmetric operating regime (AOR), in which at least one active engine of the plurality of engines is operated in an active mode to provide motive power to the rotorcraft and at least one standby engine of the plurality of engines is operated in a standby mode to provide substantially no motive power to the rotorcraft, is obtained. Engine usage data for a plurality of engines of the rotorcraft, including at least one first engine and at least one second engine of the plurality of engines, is determined. Based on the engine usage data, one of the at least one first engine and the at least one second engine is operated as the at least one active engine for the AOR, and the other one of the at least one first engine and the at least one second engine is operated as the at least one standby engine for the AOR.

In accordance with another broad aspect, there is provided a system for operating a rotorcraft comprising a plurality of engines configured to provide motive power to the rotorcraft. The system comprises a processing unit, and a non-transitory computer-readable medium having stored thereon program instructions. The program instructions are executable by the processing unit for: obtaining a request to enter into an asymmetric operating regime (AOR) in which at least one active engine of the plurality of engines is operated in an active mode to provide motive power to the rotorcraft and at least one standby engine of the plurality of engines is operated in a standby mode to provide substantially no motive power to the rotorcraft; determining engine usage data for a plurality of engines of the rotorcraft, including at least one first engine and at least one second engine of the plurality of engines; and based on the engine usage data, operating one of the at least one first engine and the at least one second engine as the at least one active engine for the AOR, and operating the other one of the at least one first engine and the at least one second engine as the at least one standby engine for the AOR.

In accordance with a further broad aspect, there is provided a method for operating a rotorcraft comprising a plurality of engines configured to provide motive power to the rotorcraft, the method. A request to enter into an asymmetric operating regime (AOR), in which at least one active engine of the plurality of engines is operated in an active mode to provide motive power to the rotorcraft and at least one standby engine of the plurality of engines is operated in a standby mode to provide substantially no motive power to the rotorcraft, is obtained. Safety checks for the plurality of engines of the rotorcraft, including at least first and second safety checks for at least one first engine and at least one second engine of the plurality of engines, are performed. When the first and second safety checks are each indicative of a healthy status for the at least one first engine and the at least one second engine, one of the at least one first engine and the at least one second engine is arbitrarily operated as the at least one active engine for the AOR, and the other one of the at least one first engine and the at least one second engine is operated as the at least one standby engine for the AOR.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

There are described herein methods and systems for operating a multi-engine rotorcraft. Under certain conditions, it can be desirable to operate the aircraft in the AOR, which is described in greater detail hereinbelow. When operated in the AOR, multiple engines of the aircraft, which may be a multi-engine helicopter or other rotorcraft, are operated at different output power levels.

Figure 1A:
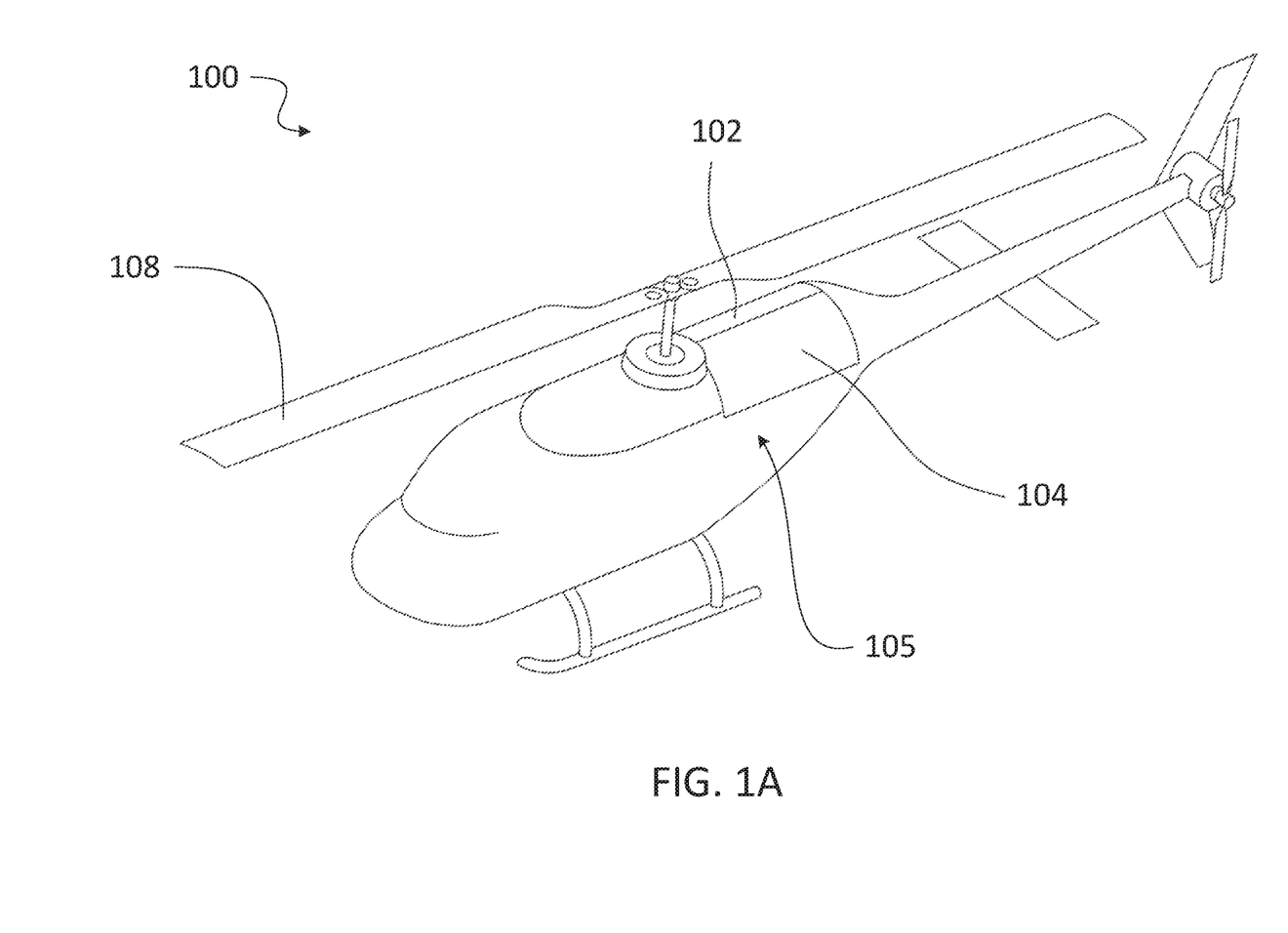
FIG. 1A is a schematic view of a multi-engine aircraft.

FIG. 1A depicts an exemplary multi-engine aircraft 100, which in this case is a helicopter. The aircraft 100 includes at least two gas turbine engines 102, 104. These two engines 102, 104 may be interconnected, in the case of the depicted helicopter application, by a common gearbox to form a multi-engine system 105, as shown in FIG. 1B, which drives a main rotor 108.

Figure 1B:
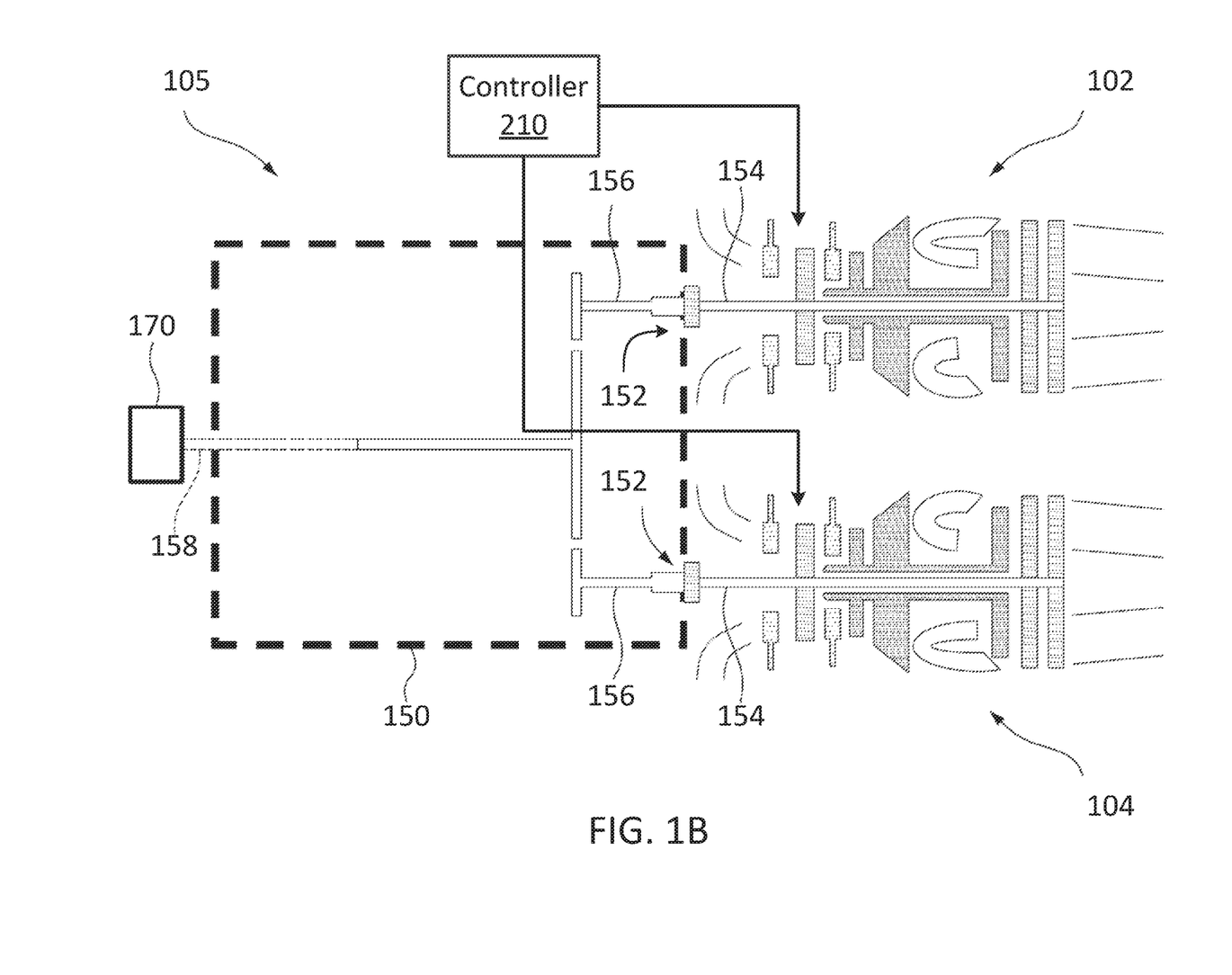
FIG. 1B is a schematic representation of an exemplary multi-engine system for the aircraft of FIG. 1A, showing axial cross-sectional views of two gas turbine engines.

Turning now to FIG. 1B, illustrated is an exemplary multi-engine system 105 that may be used as a power plant for an aircraft, including but not limited to a rotorcraft such as the helicopter 100. The multi-engine system 105 may include two or more gas turbine engines 102, 104. In the case of a helicopter application, these gas turbine engines 102, 104 will be turboshaft engines. Control of the multi-engine system 105 is effected by one or more controller(s) 210, which may be FADEC(s), electronic engine controller(s) (EEC(s)), or the like, that are programmed to manage, as described herein below, the operation of the engines 102, 104 to reduce an overall fuel burn, particularly during sustained cruise operating regimes, wherein the aircraft is operated at a sustained (steady-state) cruising speed and altitude. The cruise operating regime is typically associated with the operation of prior art engines at equivalent part-power, such that each engine contributes approximately equally to the output power of the system 105. Other phases of a typical helicopter mission include transient phases like take-off, climb, stationary flight (hovering), approach and landing. Cruise may occur at higher altitudes and higher speeds, or at lower altitudes and speeds, such as during a search phase of a search-and-rescue mission.

More particularly, the multi-engine system 105 of this embodiment includes first and second turboshaft engines 102, 104 each having a respective transmission 152 which are interconnected by a common output gearbox 150 to drive a common load 170. In one embodiment, the common load 170 may comprise a rotary wing of a rotary-wing aircraft. For example, the common load 170 may be a main rotor 108 of the aircraft 100. Depending on the type of the common load 170 and on the operating speed thereof, each of turboshaft engines 102, 104 may be drivingly coupled to the common load 170 via the output gearbox 150, which may be of the speed-reduction type.

For example, the gearbox 150 may have a plurality of transmission shafts 156 to receive mechanical energy from respective output shafts 154 of respective turboshaft engines 102, 104. The gearbox 150 may be configured to direct at least some of the combined mechanical energy from the plurality of the turboshaft engines 102, 104 toward a common output shaft 158 for driving the common load 170 at a suitable operating (e.g., rotational) speed. It is understood that the multi-engine system 105 may also be configured, for example, to drive accessories and/or other elements of an associated aircraft. As will be described, the gearbox 150 may be configured to permit the common load 170 to be driven by either of the turboshaft engines 102, 104 or, by a combination of both engines 102, 104 together.

In the present description, while the aircraft conditions (cruise speed and altitude) are substantially stable, the engines 102, 104 of the system 105 may be operated asymmetrically, with one engine operated in a high-power "active" mode and the other engine operated in a lower-power (which could be no power, in some cases) "standby" mode. Doing so may provide fuel saving opportunities to the aircraft, however there may be other suitable reasons why the engines are desired to be operated asymmetrically. This operation management may therefore be referred to as an "asymmetric mode" or the aforementioned AOR, wherein one of the two engines is operated in a lower-power (which could be no power, in some cases) "standby mode" while the other engine is operated in a high-power "active" mode. Such an asymmetric operation may be engaged for a cruise phase of flight (continuous, steady-state flight which is typically at a given commanded constant aircraft cruising speed and altitude). The multi-engine system 105 may be used in an aircraft, such as the helicopter 100, but also has applications in suitable marine and/or industrial applications or other ground operations.

Referring still to FIG. 1B, according to the present description the multi-engine system 105 is driving in this example the helicopter 100 which may be operated in the AOR, in which a first of the turboshaft engines (say, 102) may be operated at high power in an active mode and the second of the turboshaft engines (104 in this example) may be operated in a lower-power (which could be no power, in some cases) standby mode. In one example, the first turboshaft engine 102 may be controlled by the controller(s) 210 to run at full (or near-full) power conditions in the active mode, to supply substantially all or all of a required power and/or speed demand of the common load 170. The second turboshaft engine 104 may be controlled by the controller(s) 210 to operate at lower-power or no-output-power conditions to supply substantially none or none of a required power and/or speed demand of the common load 170. Optionally, a clutch may be provided to declutch the low-power engine. Controller(s) 210 may control the engine's governing on power according to an appropriate schedule or control regime. The controller(s) 210 may comprise a first controller for controlling the first engine 102 and a second controller for controlling the second engine 104. The first controller and the second controller may be in communication with each other in order to implement the operations described herein. In some embodiments, a single controller 210 may be used for controlling the first engine 102 and the second engine 104.

In another example, the AOR of the engines may be achieved through the one or more controller's 210 differential control of fuel flow to the engines, as described in pending application Ser. No. 16/535,256, the entire contents of which are incorporated herein by reference. Low fuel flow may also include zero fuel flow in some examples.

Although various differential control between the engines of the engine system 105 are possible, in one particular embodiment the controller(s) 210 may correspondingly control fuel flow rate to each engine 102, 104 accordingly. In the case of the standby engine, a fuel flow (and/or a fuel flow rate) provided to the standby engine may be controlled to be between 70% and 99.5% less than the fuel flow (and/or the fuel flow rate) provided to the active engine. In the AOR, the standby engine may be maintained between 70% and 99.5% less than the fuel flow to the active engine. In some embodiments of the method 60, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine.

In another embodiment, the controller 210 may operate one engine (say 104) of the multiengine system 105 in a standby mode at a power substantially lower than a rated cruise power level of the engine, and in some embodiments at substantially zero output power and in other embodiments less than 10% output power relative to a reference power (provided at a reference fuel flow). Alternatively still, in some embodiments, the controller(s) 210 may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the engine system 105 of FIG. 1B may be operated in an AOR by control of the relative speed of the engines using controller(s) 210, that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the AOR, such as control based on a target pressure ratio, or other suitable control parameters.

Although the examples described herein illustrate two engines, AOR is applicable to more than two engines, whereby at least one of the multiple engines is operated in a low-power standby mode while the remaining engines are operated in the active mode to supply all or substantially all of a required power and/or speed demand of a common load.

In use, the first turboshaft engine (say 102) may operate in the active mode while the other turboshaft engine (say 104) may operate in the standby mode, as described above. During operation in the AOR, if the helicopter 100 needs a power increase (expected or otherwise), the second turboshaft engine 104 may be required to provide more power relative to the low power conditions of the standby mode, and possibly return immediately to a high- or full-power condition. This may occur, for example, in an emergency condition of the multi-engine system 105 powering the helicopter 100, wherein the "active" engine loses power the power recovery from the lower power to the high power may take some time. Even absent an emergency, it will be desirable to repower the standby engine to exit the AOR.

Figure 2:
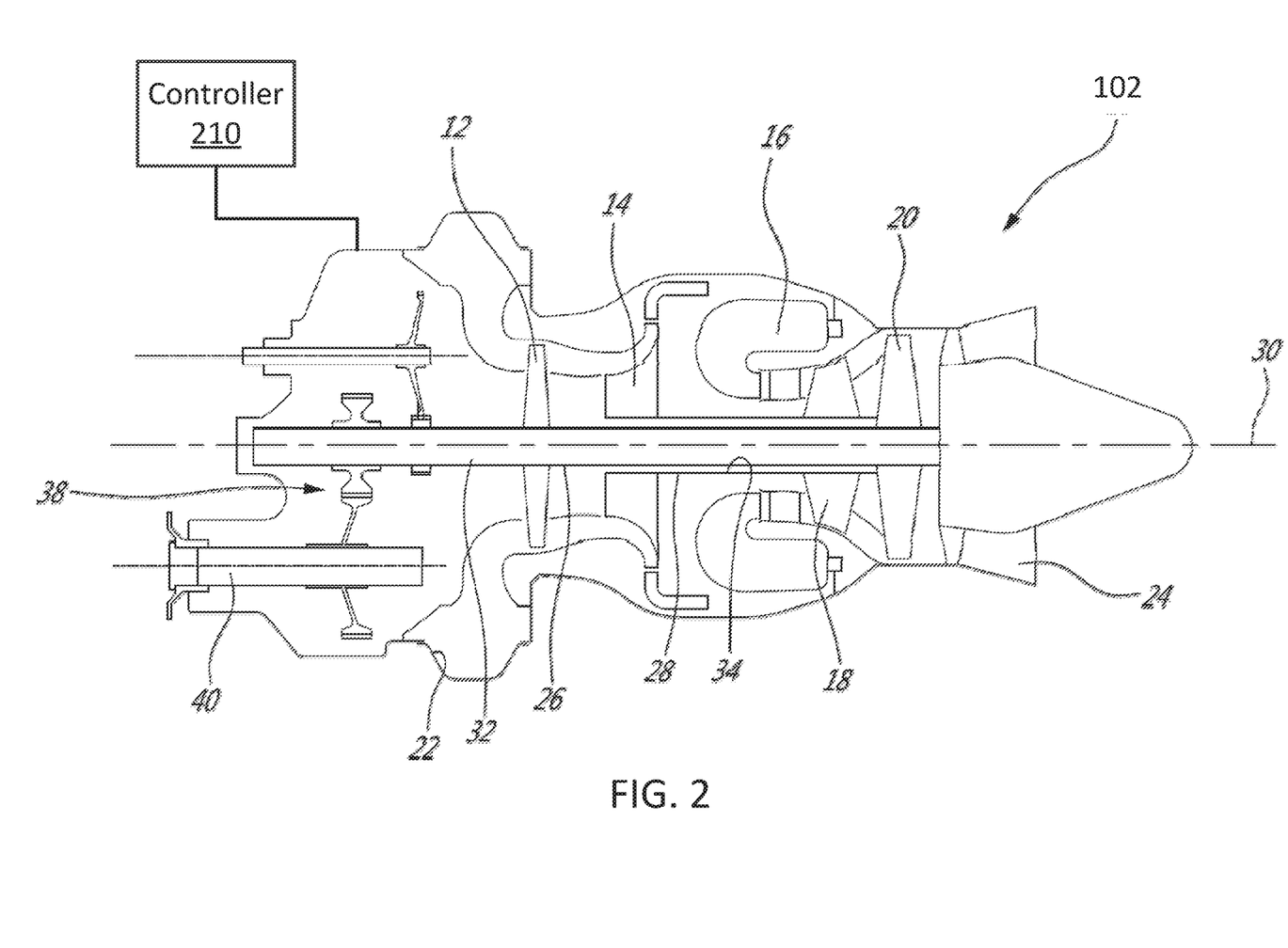
FIG. 2 is a cross-sectional view of an example turboshaft engine of the aircraft of FIG. 1.

With reference to FIG. 2, the turboshaft engines 102, 104 can be embodied as gas turbine engines. Although the foregoing discussion relates to engine 102, it should be understood that engine 104 can be substantively similar to engine 104. In this example, the engine 102 is a turboshaft engine generally comprising in serial flow communication a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The engine 102 has multiple, i.e. two or more, spools which may perform the compression to pressurize the air received through an air inlet 22, and which extract energy from the combustion gases before they exit via an exhaust outlet 24. In the illustrated embodiment, the engine 102 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The engine 102 may include a transmission 38 driven by the low pressure shaft 32 and driving a rotatable output shaft 40. The transmission 38 may vary a ratio between rotational speeds of the low pressure shaft 32 and the output shaft 40.

As described hereinabove, control of the operation of the engine 102 can be effected by one or more control systems, for example a controller 210. The controller 210 can modulate a fuel flow rate provided to the engine 102, the position and/or orientation of variable geometry mechanisms within the engine 102, a bleed level of the engine 102, and the like. In some embodiments, the controller 210 is configured for controlling operation of multiple engines, for instance the engines 102 and 104. For example, the controller 210 can be provided with one or more Full Authority Digital Engine Controllers (FADECs) or similar devices. Each FADEC can be assigned to control the operation of one or more of the engines 102, 104. Additionally, in some embodiments the controller 210 can be configured for controlling operation of other elements of the aircraft 100, for instance the main rotor 108.

Figure 3:
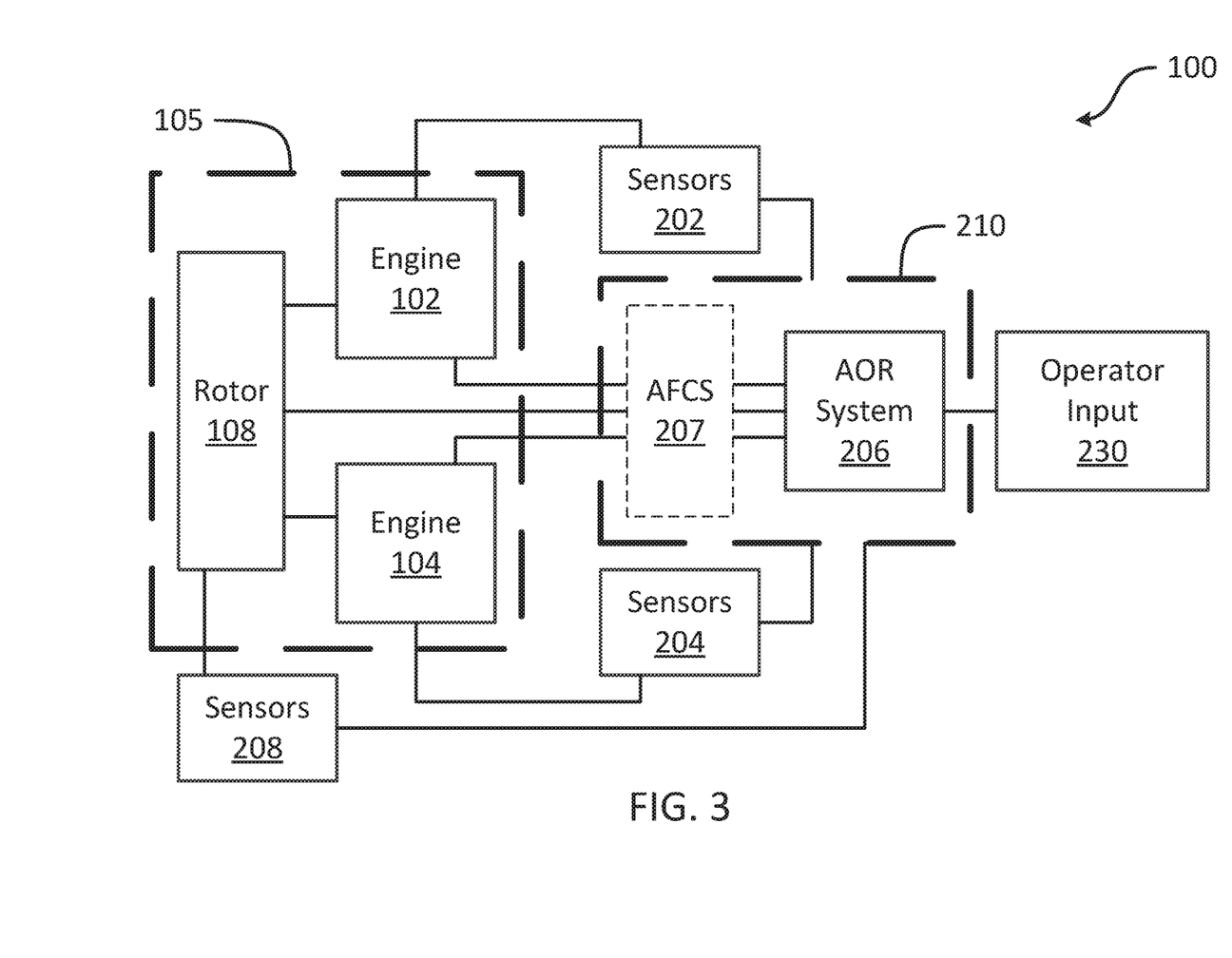
FIG. 3 is a block diagram of an example architecture for controlling entry into an asymmetric operating regime (AOR)

With reference to FIG. 3, the aircraft 100, comprising the engines 102, 104 and the rotor 108, is illustrated using a block diagram. More than two engines 102, 104 may be present on a same aircraft 100. The engines 102, 104 are mechanically coupled to the main rotor 108, for instance as illustrated in FIG. 1B, for causing the rotor 108 to rotate and produce thrust for the aircraft 100. Although FIG. 3 illustrates a singular rotor 108, it should be noted that the aircraft 100 can include any number of rotors, including multiple main rotors, one or more tail rotors, and the like. Collectively, the engines 102, 104, and the rotor 108 form part of the multi-engine system 105, which is controlled by the controller 210. The controller 210 is configured for receiving various instructions from an operator of the aircraft 100, for example via operator input 230.

The multi-engine system 105 can be controlled by way of the controller 210, as described hereinabove. The controller 210 can be composed of various devices, including one or more FADEC, one or more rotor controllers, or any other suitable devices for controlling operation of the engines 102, 104, and/or the rotor 108. In some embodiments, the operation of the engines 102, 104, and of the rotor 108 is controlled by way of one or more actuators, mechanical linkages, hydraulic systems, and the like. The controller 210 can be coupled to the actuators, mechanical linkages, hydraulic systems, and the like, in any suitable fashion for effecting control of the engines 102, 104 and/or of the rotor 108. For example, if a change in the operating conditions of the aircraft 100 is detected without any corresponding change in inputs from an operator of the aircraft 100, the FADEC can adjust the inputs to compensate for the uncommanded change.

One or more sensors 202, 204 are coupled to the engines 102, 104, for acquiring data about the operating parameters of the engines 102, 104. Additionally, sensors 208 are coupled to the rotor 108 for acquiring data about the operating parameters of the rotor 108. The sensors 202, 204, 208 may be any suitable type of sensor used to measure operating parameters such as but not limited to speed sensors, acceleration sensors, pressure sensors, temperature sensors, altitude sensors, and the like. The sensors 202, 204, 208, can be coupled to the controller 210 in any suitable fashion, including any suitable wired and/or wireless coupling techniques.

The controller 210 can be provided with an AOR system 206 which is configured to control operation of the engines 102, 104, and of the rotor 108, when the aircraft 100 is operating in the AOR. In certain embodiments, prior to entry into, or exit from, the AOR, various operating parameters for the engines 102, 104, and/or for the rotor 108, must be within predetermined bands and/or at, below, or above certain predetermined values. In some embodiments, when operating in the AOR, one of the engines, for example engine 102, is set as the so-called "active engine", and the other engines, in this example engine 104, is set as the so-called "standby engine". It should be noted that the association between engines 102, 104 and the active/standby status is solely for the purposes of the following example.

In some embodiments, the AOR system 206 effects changes in flight controls via an optional automatic flight control system (AFCS) 207 of the controller 210. The AFCS 207 can be configured for adjusting one or more inputs acquired from the operator input 230. The operator input 230 can include a collective lever input, a cyclic input, a pedal input, and/or any other suitable inputs for controlling operation of the aircraft 100. In some embodiments, the AFCS 207 can adjust the inputs by way of mechanical linkages, actuators, or the like, which adjust the position and/or orientation of various surfaces and mechanical machines. In other embodiments, the AFCS 207 can adjust analog or digital signals transmitted to actuators or other devices which control operation of the engines 102, 104, and/or of the rotor 108. Other approaches are also considered.

As described hereinabove, when operating in the AOR, the active engine (engine 102) and the passive engine (engine 104) are operated at different output power levels. In the course of operation of the aircraft 100, an operator of the aircraft 100 can request that the aircraft enter the AOR for a flight segment. Alternatively, or in addition, the aircraft 100 can be configured to automatically attempt to enter the AOR for a flight segment under certain conditions, for instance based on a pre-established flight mission plan. Irrespective of whether entry into the AOR is commanded by an operator or occurs automatically, a decision is made regarding which of the engines 102, 104 will be set as the active engine, and which will be set as the standby engine. As used herein, a flight segment can refer to any flight mission, or any portion of any flight mission, and can be of any suitable length or duration, and can occur at any suitable time during a flight mission.

With continued reference to FIG. 3, the AOR system 206 can obtain a request to enter the AOR. The request can be obtained from an operator, for instance via the operator input 230, via another element within the controller 210, or in any other suitable fashion. In some embodiments, the controller 210 is provided with a flight mission plan, and can automatically issue a request to the AOR system 206 for commanding entry into the AOR. Upon receipt of the request to enter the AOR, the AOR system 206 can perform one or more evaluations of the engines 102, 104 in order to select the active and/or the standby engines for operation.

In some embodiments, after obtaining the request to enter the AOR, the AOR system 206 can optionally perform a safety check of the engines 102, 104. When the safety check indicates that one of the engines 102, 104 cannot safely be operated as the active engine, the AOR system 206 can operate the engine which cannot be the active engine as the standby engine, and can operate the other engine as the active engine. Alternatively, or in addition, when the safety check indicates that the AOR cannot safely be entered into, the AOR system 206 can refuse entry into the AOR, and can for example alert the operator that the AOR cannot safely be entered into. The alert can be any suitable audible alert, visible alert, sensory alert, or the like.

If the safety check confirms that entry into the AOR can be performed safely, or if no safety check is performed, the AOR system 206 can then select one of the engines 102, 104 to be operated as the active engine. When selecting one of the engines 102, 104 to be operated as the active engine, the AOR system 206 can determine engine usage data for the engines 102, 104. In some embodiments, the AOR system 206 operates one of the engines 102, 104 as the active engine based on the engine usage data, and operates the other one of the engines 102, 104 as the standby engine. Alternatively, or in addition, the AOR system can operate one of the engines 102, 104 as the standby engine based on the engine usage data, and operates the other one of the engines 102, 104 as the active engine. The type of engine usage data available to, or used by, the AOR system 206 in selecting the active engine and/or the standby engine can vary between embodiments. It should be noted that the result of the safety check can be included as part of the engine usage data In some embodiments, the engine usage data is indicative of which of the engines 102, 104 was used during a previous AOR flight segment, or during multiple previous AOR flight segments. The AOR system 206 can select one of the engines 102, 104 to be operated as the active engine based on which one of the engines 102, 104 was used as the active engine in the previous AOR flight segment. Alternatively, or in addition, the engine usage data is indicative of which of the engines 102, 104 was operated as the standby engine during a previous AOR flight segment, or during multiple previous AOR flight segments.

In some cases, the selection of one of the engines 102, 104 to be operated as the active engine is switched after every AOR flight segment. This approach can be employed to attempt to ensure a substantially-equal distribution of AOR flight segments between both engines 102, 104. For example, when the engine 102 was operated as the active engine during a most recent previous flight segment, the engine 102 can be operated as the standby engine for an upcoming AOR flight segment, and the engine 104 can be operated as the active engine.

In some other cases, the selection of one of the engines 102, 104 to be operated as the active engine is switched after every two AOR flight segments. This approach can be employed when the aircraft 100 is used to perform multiple roundtrip flight missions with mismatched loads. For instance, when the aircraft 100 is used to ferry persons or material to a remote job site, the aircraft 100 will have a heavier load during flight missions to the remote job site, and a lighter load during flight missions returning from the remote job site. If the selection of the active engine is switched at every AOR flight segment, one of the engines 102, 104 may be more regularly assigned the heavier load flight segment, and the other one of the engines 102, 104 may be more regularly assigned the lighter load flight segment, which can result in mismatches in engine wear.

Thus, in some such cases, the AOR system 206 can determine which of the engines 102, 104 was operated as the active engine during two previous flight segments. If the engine 102 was operated as the active engine during both previous flight segments, then the engine 102 is operated as the standby engine for an upcoming AOR flight segment, and the engine 104 is operated as the active engine. If the engine 102 was operated as the active engine in a first previous flight segment and as the standby engine in a second previous flight segment (with the second previous flight segment occurring prior to the first previous flight segment), then the engine 102 is operated as the active engine, and the engine 104 is operated as the standby engine.

In some other cases, the selection of one of the engines 102, 104 to be operated as the active engine is switched every time the aircraft 100, or the multi-engine system 105, is shutdown. When operating roundtrip flight missions, as discussed hereinabove, the aircraft 100 may not be shut down when at the remote job site, or may not be refueled at the remote job site. Therefore, this approach can be used to reduce the risk of mismatches in engine wear. For example, the engine 102 is operated as the active engine during a number of previous flight missions. For a subsequent flight mission following shutdown of the aircraft 100, or of the multi-engine system 105, the AOR system 206 can determine that the engine 102 was previously operated as the active engine and that a shutdown has occurred. The AOR system 206 can therefore operate the engine 104 as the active engine, and operate the engine 102 as the standby engine.

In some embodiments, the AOR system 206 can evaluate a time delay between shutdown and restart of the aircraft 100, or the multi-engine system 105. A time delay shorter than a shutdown threshold may indicate that the aircraft 100 was not refueled or reloaded with cargo. When the AOR system 206 detects that the aircraft 100, or the multi-engine system 105, was shut down for a period of time less than the threshold, the AOR system 206 can determine that no refueling or reloading has taken place, and delay switching of the active engine until a shutdown period longer than the threshold is detected. When the AOR system 206 detects that the aircraft 100, or the multi-engine system 105, was shut down for a period of time greater than the threshold, the AOR system 206 can determine that a shutdown has taken place, and switch the active engine upon the next request to enter the AOR.

In some other embodiments, the engine usage data is indicative of a severity of one or more previous AOR flight segments and/or an upcoming AOR flight segment. The AOR system 206 can operate one of the engines 102, 104 as the active engine based on which one of the engines 102, 104 was operated as the active engine in the previous AOR flight segment, and/or based on the severity of previous and/or upcoming AOR flight segments.

In some instances, the severity of a flight segment is based on a required power level for the aircraft 100 when entering the AOR. The required power level can be assessed using any suitable approach. For example, the required power level can be assessed based on the amount of power provided by the engines 102, 104 during a takeoff segment or during a cruising segment of the flight mission. For example the severity can be set as "light" or "hard" depending on whether the required power level is below or above a power threshold. In some cases, the power threshold can be dynamically determined based on flight altitude, ambient operating temperature and/or pressure, and the like. For example, an engine torque sensor is used to assess a required power level for the aircraft 100. In another example, a temperature sensor is used to measure a turbine operating temperature, which can be indicative of a required power level for the aircraft 100. Still other examples are considered.

In some other instances, the severity of a flight segment is based on the flight weight of the aircraft 100 at the time of entry into the AOR, or the weight of the aircraft 100 at some time prior to the entry into the AOR. The severity can be set as light or hard depending on whether the flight weight of the aircraft is below or above a weight threshold. In some cases, the weight threshold can be dynamically determined based on flight altitude, ambient operating temperature and/or pressure, and the like.

For example, the AOR system 206 is configured to switch the one of the engines 102, 104 operated as the active engine when the upcoming AOR flight segment is a hard segment (for instance, when the flight weight is above the weight threshold). If engine 102 was the active engine during a previous easy segment or a previous hard segment, and the upcoming flight segment is a hard segment, the AOR system 206 will select engine 104 to be operated as the active engine. If engine 102 was the active engine during a previous easy segment or a previous hard segment, and the upcoming flight segment is another easy segment, the AOR system 206 will select engine 102 to be operated as the active engine. Other approaches are also considered.

In another example, the AOR system 206 can implement a counter which tracks the number of hard AOR flight segments for the engines 102, 104, and can operate the engine 102, 104 having a fewer number of hard AOR flight segments as the active engine for an upcoming hard flight segment. In a further example, the AOR system 206 can additionally track the number of light AOR flight segments, and distribute hard and light segments to maintain a balance between the engines 102, 104. It should also be noted that embodiments in which the AOR system 206 assesses flight segments with qualifiers beyond light and hard (e.g., medium, very hard, etc.) are also considered. For instance, the AOR system 206 can implement a point system which assigns points to the engines 102, 104 based on the severity of an AOR flight segment a very hard segment can award 5 points, a hard segment can award 3, a light segment can award 1, etc. The AOR system 206 can then operate one of the engines 102, 104 as the active engine based on which of the engines 102, 104, has a lower score. Other embodiments are also considered.

In some further embodiments, the engine usage data is indicative of a count of active-engine flight segments for the engines 102, 104; that is to say, a count of the number of flight segments during which each of the engines 102, 104 was the active engine. The AOR system 206 can operate one of the engines 102, 104 as the active engine based on which one of the engines 102, 104 has a lower count of active-engine flight segments.

In some still further embodiments, the engine usage data is indicative of a remaining lifespan for the engines 102, 104; that is to say, a measure of an amount of remaining usage for the engines 102, 104 before which maintenance or servicing will be required. The AOR system 206 can operate one of the engines 102, 104 as the active engine based on which one of the engines 102, 104 has a higher remaining lifespan.

It should be noted that although the foregoing description primarily discloses embodiments in which the aircraft 100 includes two engines, namely engines 102, 104, similar techniques can be applied to aircraft 100 which include a greater number of engines. For example, an aircraft with four engines can operate in the AOR with two active engines and two standby engines; the selection of which engines to be operated as the active engine can be performed using substantially similar steps. In another example, an aircraft with three engines can operate in the AOR with one active engine and two standby engines. In some cases, a selection of the engine(s) to be operated as the active engine(s) is performed, for instance as described hereinabove, and the remaining engines are by default set as the standby engines. In other cases, selection of the engine(s) to be operated as the standby engine(s) is performed, and the remaining engine is by default set as the standby engine. Other approaches, and other configurations with a greater number of engines, are also considered.

Figure 4:
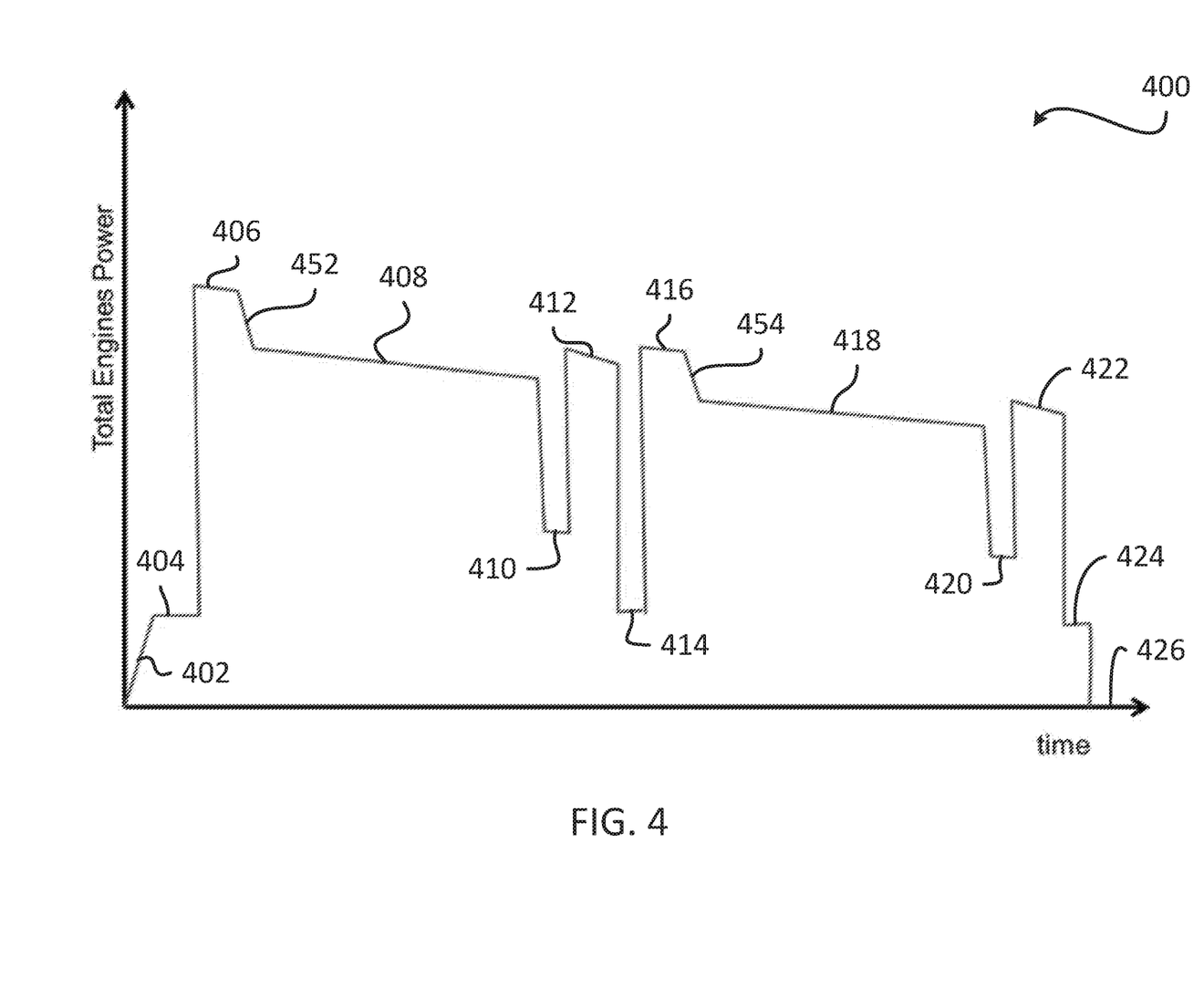
FIG. 4 is a graphical illustration of an example approach for controlling entry into the AOR.

With reference to FIG. 4, there is shown a graphical representation of an example flight mission 400, plotting total power from the engines 102, 104 against time. During period 402, the engines 102, 104 are started. During period 404, the engines 102, 104 are idled before takeoff. During period 406, the engines 102, 104 are accelerated for takeoff and climbing. In some embodiments, the AOR system 206 can assess the total power required during period 406 to assess the severity of the upcoming cruise segment, during which the aircraft 100 may be operated in the AOR.

Period 408 is a cruise segment, during which the aircraft 100 may be requested to operate in the AOR. The request can be provided by an operator of the aircraft 100, or by the controller 210. Upon obtaining the request to enter the AOR, the AOR system 206 can operate one of the engines 102, 104 as the active engine, based on any suitable engine usage data, as described hereinabove, and the other one of the engines 102, 104, as the standby engine. The transition into the AOR occurs in period 452, where the total engine power is decreased because the standby engine is commanded to reduce its output power, and the active engine is set to operate at a power level sufficient for providing a majority of the motive power for the aircraft 100. The downward slope of the curve in period 408 indicates that, as the aircraft 100 is cruising, fuel expenditure by the aircraft 100 is causing a reduction in weight of the aircraft 100, thereby requiring less power to fly the aircraft 100.

During period 410, the AOR is exited, and the active engine is decelerated during descent. In some cases, the standby engine can be accelerated upon exit from the AOR, for example to provide power during descent. During period 412, the engines 102, 104 are reaccelerated for approach and landing. Then, during period 414, the engines 102, 104 are idled, for instance when unloading passengers or freight. During period 416, the engines 102, 104 are accelerated for subsequent takeoff, ahead of a second cruise segment.

Period 418 is a second cruise segment, during which the aircraft 100 may be requested to operate in the AOR. In this example, the load for the aircraft 100 during period 418 is lower than during period 408, for instance because the aircraft 100 has unloaded passengers and/or freight. The request to enter the AOR can be provided by an operator of the aircraft 100, or by the controller 210. Upon obtaining the request to enter the AOR, the AOR system 206 can operate one of the engines 102, 104 as the active engine, based on any suitable engine usage data, as described hereinabove. The transition into the AOR occurs in period 454, where the total engine power is decreased because the standby engine is commanded to reduce its output power, and the active engine is set to operate at a power level sufficient for providing a majority of the motive power for the aircraft 100. Again, the downward slope of the curve in period 408 is to indicate that, as the aircraft 100 is cruising, fuel expenditure by the aircraft 100 is lightening the aircraft 100, requiring less power.

In some embodiments, the engine operated as the active engine for the AOR in period 408 is different from the engine operated as the active engine for the AOR in period 418, because the AOR system 206 switches the active engine upon every entry into the AOR. In some other embodiments, the engine operated as the active engine for the AOR in period 408 and 418 is the same engine, because the AOR system 206 switches the active engine upon every second entry into the AOR, or because the AOR system 206 switches the active engine upon every shutdown of the aircraft 100.

In some further embodiments, the AOR system 206 evaluates the severity of the flight segments in periods 408 and 418 when operating one of the engines 102, 104 as the active engine for the AOR. For example, because the flight segment in period 418 is of a lower severity than the flight segment in period 408, the same engine is used as the active engine in both segments.

Period 420 is a second descent flight segment: the AOR is exited, and the active engine is decelerated. In some cases, the standby engine can be accelerated upon exit from the AOR, for example to provide power during descent. Period 422 is a second approach and landing segment, during which the engines 102, 104 are accelerated. The engines 102, 104 are idled during period 424, for instance during unloading of passengers and/or freight, or for instance when performing final safety checks before shutting down the aircraft 100 during period 426.

Figure 5:
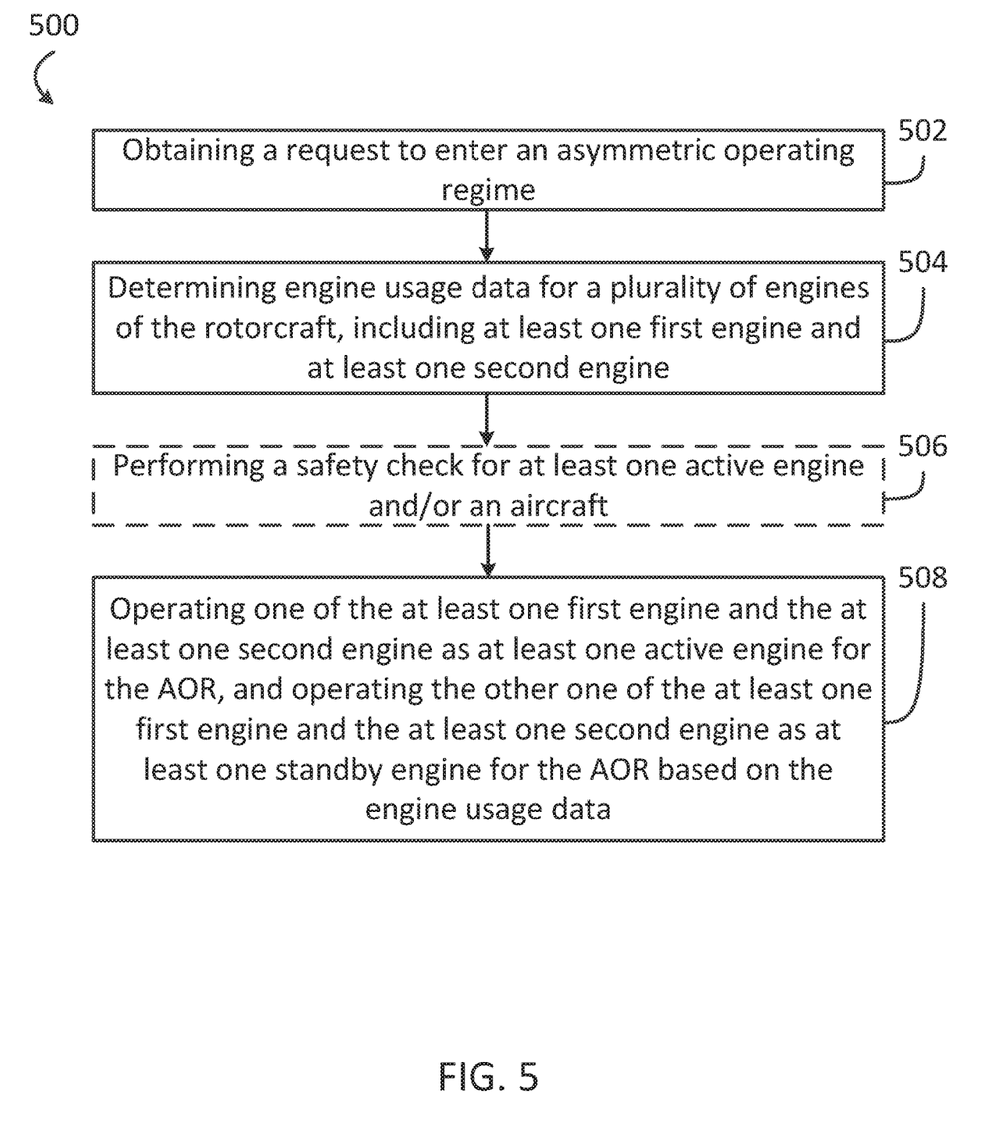
FIG. 5 is a flowchart of an example method for controlling entry into the AOR.

With reference to FIG. 5, there is shown a flowchart illustrating a method 500 for operating a multi-engine rotorcraft, for example the aircraft 100. In some embodiments, the aircraft 100 is a helicopter. At step 502, a request to enter the AOR is obtained. The request can be obtained from an operator, for example via the operator input 230, or from a control system of the aircraft 100, for example the controller 210. The request can include any suitable information, including, for instance, engine usage data.

At step 504, engine usage data for a plurality of engines, including at least the engines 102, 104, is determined. The engine usage data can be indicative of which of the engines 102, 104 were operated as the active and standby engines for one or more previous AOR flight segments, an indication of how recently a shutdown of the aircraft 100 and/or of the multi-engine system 105 has occurred, a measure of the severity of one or more previous AOR flight segments, a remaining lifespan for the engines 102, 104, or any other suitable engine usage data. In some embodiments, the engine usage data is obtained by the AOR system 206 from a database or other data storage device on the aircraft 100. The plurality of engines can include any suitable number of engines, for example three, four, or more engines.

Optionally, at step 506 a safety check is performed for one or more of the plurality of engines, for example for the active engine 102, and/or for the aircraft 100. The safety check can relate to any suitable operating parameters of the engines 102, 104 and/or the aircraft 100, and the results of the safety check can be included in the engine usage data.

At step 508, one of the engines 102, 104 is operated as the active engine for the AOR, and the other one of the engines 102, 104 is operated as the standby engine, based on the engine usage data. Optionally, if the safety check is performed at step 506 and indicates that a particular one of the engines 102, 104 is not functional, or not suitably functional for operating as the active engine, the particular engine can be set as the standby engine.

Figure 6:
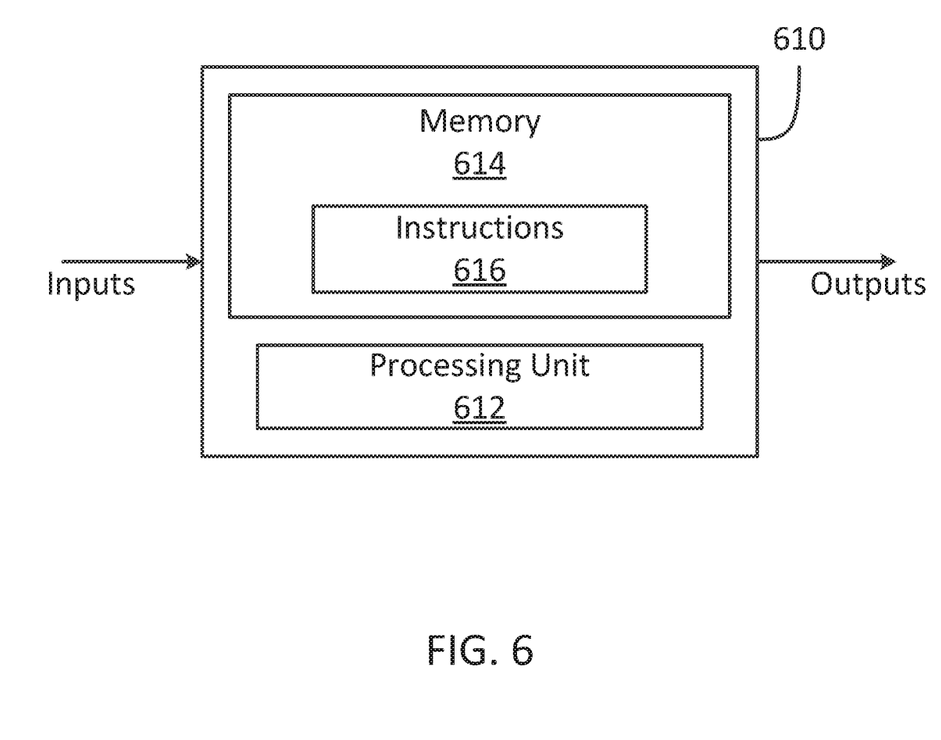
FIG. 6 is a block diagram of an example computing device for implementing the method of FIG. 5.

With reference to FIG. 6, the method 500 may be implemented by a computing device 610, which can embody part or all of the controller 210, the AOR system 206, and/or the AFCS system 207. The computing device 610 comprises a processing unit 612 and a memory 614 which has stored therein computer-executable instructions 616. The processing unit 612 may comprise any suitable devices configured to implement the functionality of the AOR system 206 and/or the functionality described in the method 500, such that instructions 616, when executed by the computing device 610 or other programmable apparatus, may cause the functions/acts/steps performed by the AOR system 206 and/or described in the method 500 as provided herein to be executed. The processing unit 612 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 614 may comprise any suitable known or other machine-readable storage medium. The memory 614 may comprise non-transitory computer readable storage medium, for example, but not limited to, an electronic, magnetic, optical, electromagnetic, infrared, or semiconductor system, apparatus, or device, or any suitable combination of the foregoing. The memory 614 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may comprise any storage means (e.g., devices) suitable for retrievably storing machine-readable instructions 616 executable by processing unit 612.

The methods and systems for operating a multi-engine rotorcraft as described herein may be implemented in a high level procedural or object oriented programming or scripting language, or a combination thereof, to communicate with or assist in the operation of a computer system, for example the computing device 610. Alternatively, the methods and systems described herein may be implemented in assembly or machine language. The language may be a compiled or interpreted language.

Embodiments of the methods and systems described herein may also be considered to be implemented by way of a non-transitory computer-readable storage medium having a computer program stored thereon. The computer program may comprise computer-readable instructions which cause a computer, or more specifically the processing unit 612 of the computing device 610, to operate in a specific and pre-defined manner to perform the functions described herein, for example those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for operating a rotorcraft comprising a plurality of engines configured to provide motive power to the rotorcraft, the method comprising:
   obtaining a request to enter into an asymmetric operating regime (AOR) in which at least one active engine of the plurality of engines is operated in an active mode to provide motive power to the rotorcraft and at least one standby engine of the plurality of engines is operated in a standby mode to provide substantially no motive power to the rotorcraft;
   determining engine usage data for a plurality of engines of the rotorcraft, including at least one first engine and at least one second engine of the plurality of engines; and
   based on the engine usage data, operating one of the at least one first engine and the at least one second engine as the at least one active engine for the AOR, and operating the other one of the at least one first engine and the at least one second engine as the at least one standby engine for the AOR.

2. The method of claim 1, wherein the engine usage data is indicative of a first severity of a previous flight mission and of at least one previously-active engine during the previous flight mission, and wherein operating the one of the at least one first engine and the at least one second engine as the at least one active engine comprises:

when the first severity is below a severity threshold, operating the at least one previously-active engine as the at least one active engine; and when the first severity is above the severity threshold, operating at least one previously-standby engine, different from the at least one previously-active engine, as the at least one active engine.

3. The method of claim 2, wherein the engine usage data is further indicative of a second severity of an upcoming flight mission, and wherein operating the one of the at least one first engine and the at least one second engine as the active engine comprises:

when the first severity is below the severity threshold and the second severity is above the severity threshold, operating the at least one previously standby-engine as the at least one active engine; and when the first severity is above the severity threshold and the second severity is below the severity threshold, operating the at least one previously-active engine as the at least one active engine.

4. The method of claim 3, wherein the first severity is based on a flight weight of the rotorcraft for the previous flight mission, and wherein the second severity is based on a flight weight of the rotorcraft for the upcoming flight mission.

5. The method of claim 1, wherein the engine usage data is indicative of a count of active-engine flight segments for the plurality of engines, and wherein operating the one of the at least one first engine and the at least one second engine as the at least one active engine comprises operating the one of the at least one first engine and the at least one second engine for which the count of active-engine flight segments is lower.

6. The method of claim 1, wherein the engine usage data is indicative of a remaining lifespan for the plurality of engines, and wherein operating the one of the at least one first engine and the at least one second engine as the at least one active engine comprises operating the one of the at least one first engine and the at least one second engine having a larger remaining lifespan.

7. The method of claim 1, wherein the engine usage data is indicative of which of the plurality of engines was operated as at least one previously-standby engine during a previous flight mission, and wherein operating the one of the at least one first engine and the at least one second engine as the at least one active engine comprises operating the at least one previously-standby engine as the at least one active engine.

8. The method of claim 1, wherein the engine usage data is indicative of which of the plurality of engines was operated as at least one previously-standby engine during a first previous flight mission and during a second previous flight mission, the first previous flight mission occurring prior to the second previous flight mission, and wherein operating the one of the at least one first engine and the at least one second engine as the at least one active engine comprises:

when the at least one previously-standby engine during the first and the second previous flight missions is at least one common one of the at least one first engine and the at least one second engine, operating the at least one common one of the at least one first engine and the at least one second engine as the at least one active engine; and when the at least one previously-standby engine during the first and the second previous flight missions are different ones of the at least one first engine and the at least one second engine, operating the at least one previously-standby engine during the second previous flight mission as the at least one active engine.

9. The method of claim 1, wherein the engine usage data is indicative of which of the plurality of engines was operated as at least one previously-standby engine prior to the rotorcraft entering a shutdown state, and wherein operating the at least one of the at least one first engine and the at least one second engine as the at least one active engine comprises operating the at least one previously-standby engine as the at least one active engine.

10. The method of claim 1, further comprising, prior to operating at least one of the at least one first engine and the at least one second engine as the at least one active engine for the AOR, performing safety checks for at least some of the plurality of engines of the rotorcraft, and when the safety check for at least one of the at least one first engine and the at least one second engine of the rotorcraft is indicative of unsafe operation, operating the at least one of the at least one first engine and the at least one second engine as the at least one standby engine.

11. A system for operating a rotorcraft comprising a plurality of engines configured to provide motive power to the rotorcraft, the system comprising:

a processing unit; and a non-transitory computer-readable medium having stored thereon program instruction executable by the processing unit for:

obtaining a request to enter into an asymmetric operating regime (AOR) in which at least one active engine of the plurality of engines is operated in an active mode to provide motive power to the rotorcraft and at least one standby engine of the plurality of engines is operated in a standby mode to provide substantially no motive power to the rotorcraft;

determining engine usage data for a plurality of engines of the rotorcraft, including at least one first engine and at least one second engine of the plurality of engines; and based on the engine usage data, operating one of the at least one first engine and the at least one second engine as the at least one active engine for the AOR, and operating the other one of the at least one first engine and the at least one second engine as the at least one standby engine for the AOR.

12. The system of claim 11, wherein the engine usage data is indicative of a first severity of a previous flight mission and of at least one previously-active engine during the previous flight mission, and wherein operating the one of the at least one first engine and the at least one second engine as the at least one active engine comprises:

when the first severity is below a severity threshold, operating the at least one previously-active engine as the at least one active engine; and when the first severity is above the severity threshold, operating at least one previously-standby engine, different from the at least one previously-active engine, as the at least one active engine.

13. The system of claim 12, wherein the engine usage data is further indicative of a second severity of an upcoming flight mission, and wherein operating the one of the at least one first engine and the at least one second engine as the active engine comprises:

when the first severity is below the severity threshold and the second severity is above the severity threshold, operating the at least one previously standby-engine as the at least one active engine; and when the first severity is above the severity threshold and the second severity is below the severity threshold, operating the at least one previously-active engine as the at least one active engine.

14. The system of claim 13, wherein the first severity is based on a flight weight of the rotorcraft for the previous flight mission, and wherein the second severity is based on a flight weight of the rotorcraft for the upcoming flight mission.

15. The system of claim 11, wherein the engine usage data is indicative of a count of active-engine flight segments for the plurality of engines, and wherein operating the one of the at least one first engine and the at least one second engine as the at least one active engine comprises operating the one of the at least one first engine and the at least one second engine for which the count of active-engine flight segments is lower.

16. The system of claim 11, wherein the engine usage data is indicative of a remaining lifespan for the plurality of engines, and wherein operating the one of the at least one first engine and the at least one second engine as the at least one active engine comprises operating the one of the at least one first engine and the at least one second engine having a larger remaining lifespan.

17. The system of claim 11, wherein the engine usage data is indicative of which of the plurality of engines was operated as at least one previously-standby engine during a previous flight mission, and wherein operating the one of the at least one first engine and the at least one second engine as the at least one active engine comprises operating the at least one previously-standby engine as the at least one active engine.

18. The system of claim 11, wherein the engine usage data is indicative of which of the plurality of engines was operated as at least one previously-standby engine during a first previous flight mission and during a second previous flight mission, the first previous flight mission occurring prior to the second previous flight mission, and wherein operating the one of the at least one first engine and the at least one second engine as the at least one active engine comprises:

when the at least one previously-standby engine during the first and the second previous flight missions is at least one common one of the at least one first engine and the at least one second engine, operating the at least one common one of the at least one first engine and the at least one second engine as the at least one active engine; and when the at least one previously-standby engine during the first and the second previous flight missions are different ones of the at least one first engine and the at least one second engine, operating the at least one previously-standby engine during the second previous flight mission as the at least one active engine.

19. The system of claim 11, wherein the engine usage data is indicative of which of the plurality of engines was operated as at least one previously-standby engine prior to the rotorcraft entering a shutdown state, and wherein operating the at least one of the at least one first engine and the at least one second engine as the at least one active engine comprises operating the at least one previously-standby engine as the at least one active engine.

20. A method for operating a rotorcraft comprising a plurality of engines configured to provide motive power to the rotorcraft, the method, comprising:

obtaining a request to enter into an asymmetric operating regime (AOR) in which at least one active engine of the plurality of engines is operated in an active mode to provide motive power to the rotorcraft and at least one standby engine of the plurality of engines is operated in a standby mode to provide substantially no motive power to the rotorcraft;

performing safety checks for the plurality of engines of the rotorcraft, including at least first and second safety checks for at least one first engine and at least one second engine of the plurality of engines; and when the first and second safety checks are each indicative of a healthy status for the at least one first engine and the at least one second engine, arbitrarily operating one of the at least one first engine and the at least one second engine as the at least one active engine for the AOR, and operating the other one of the at least one first engine and the at least one second engine as the at least one standby engine for the AOR.

* * * * *